C. J. TUSETH.
PLOW.
APPLICATION FILED JAN. 29, 1913.
1,106,526.
Patented Aug. 11, 1914.
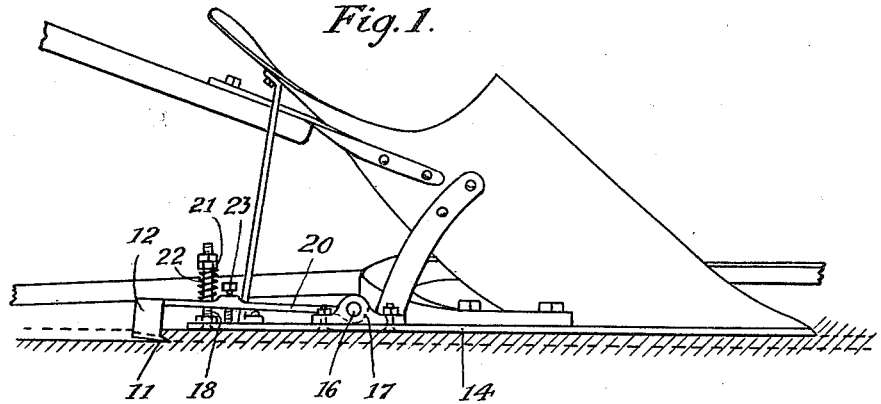
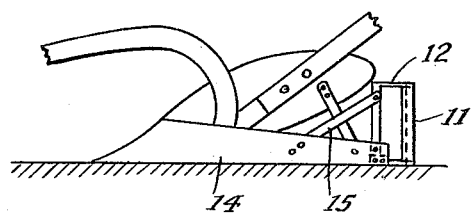
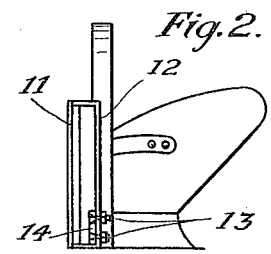
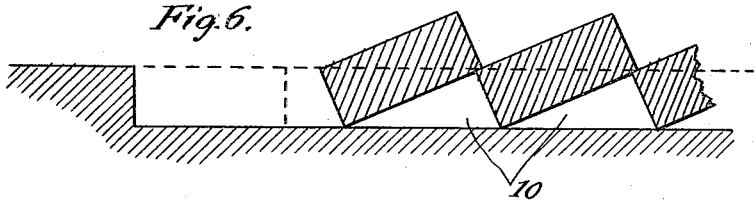
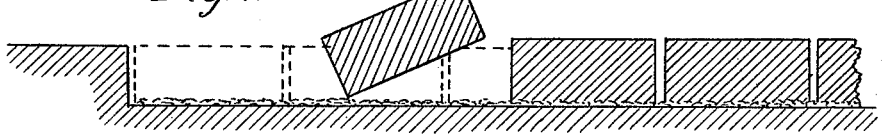
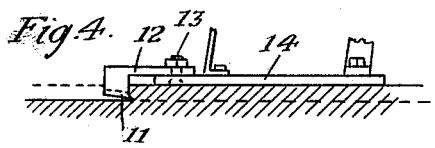
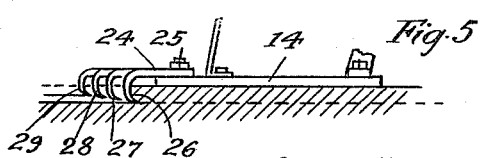
Witnesses:
Theo. Lagaard.
H. A. Bowman.
Inventor:
Charles J. Tuseth.
By F. A. Whitley
his Attorney.

UNITED STATES PATENT OFFICE.

CHARLES J. TUSETH, OF OSSEO, MINNESOTA.

PLOW.

1,106,526.  Specification of Letters Patent.  Patented Aug. 11, 1914.

Application filed January 29, 1913. Serial No. 744,890.

*To all whom it may concern:*

Be it known that I, CHARLES J. TUSETH, a citizen of the United States, residing at Osseo, in the county of Hennepin and State of Minnesota, have invented certain new and useful Improvements in Plows, of which the following is a specification.

My invention relates to plows and has for its object to provide a device to be attached to the landside of a plow which will slice off or break down an additional segment of the furrow wall back of said landside so that the furrow slice turned by the share will be of somewhat less width than the furrow actually cut so that succeeding furrow slices will fall flat in the furrow and not stand on edge as is at present true, especially in breaking The full objects and advantages of my invention will appear in connection with the detailed description thereof and are particularly pointed out in the claims.

In the drawings, illustrating the application of my invention in one form,—Figure 1 is a bottom plan view of a plow having my attachment secured thereto viewed from beneath. Fig. 2 is a rear elevation of the same. Fig. 3 is a side elevation of the parts shown in Fig. 2. Fig. 4 shows a modified form of the means for attaching the slicer to the landside. Fig. 5 shows a means for pulling down the side of the furrow wall consisting of a series of hooks. Fig. 6 is a diagrammatic view showing the manner in which the successive furrow slices lie in ordinary plowing, while Fig. 7 shows diagrammatically in the manner in which the furrow slices will lie when employing my invention.

In plowing, especially in breaking new land, where the usual form of plow is employed, the successive furrows or slices of land turned over by the plow do not fall flat upside down but the furrows are tipped on edge resting with one edge upon the solid subsoil and at the other edge upon the furrow previously turned, as shown on Fig. 6. This leaves a cavity, such as indicated at 10, in which there is no earth so that there is more or less circulation and the sides which have been turned dry out very rapidly. This has long been recognized as a serious defect in plowing. Many devices, such as disk harrows, have been invented and employed for cutting up these upended sods so that pieces thereof may fall into the cavities and the soil be compacted so it will not dry out. Oftentimes, in fact usually, it is the practice to plant crops directly upon the freshly turned sod. Most of the flax grown in the country is so planted and many other crops do well under those conditions. But if dry weather follows, owing to the cavities under the sods, the sods may become so dry that either the seed does not germinate, or worse, after germination is killed. It has been found that because of the fact that the cavities which I have referred to are buried beneath the sods, none of the leveling and harrowing devices in use will effectively fill all of these cavities so as to prevent drying of the sods. Moreover, the harrowing and disking is otherwise undesirable because it cuts up and pulverizes the sod to too great an extent. My device remedies this unfavorable condition in plowing by turning down an additional slice from the furrow wall at the landside, so that the furrow slice turned over by the plow share is of sufficiently less width than the furrow into which it should descend to permit said slice to turn completely over and lie flat upon the ground. Many different forms of devices for this purpose may be employed, and it is to a large extent immaterial how the same is attached to the plow so long as it operates without interfering with any of the plowing devices.

As shown in Figs. 2 and 4, a blade 11 is carried upon an upright or frame member 12 which has a portion securely bolted at 13 to the landside 14 of the plow, the bolts extending through from the outside and having their heads countersunk, as best shown in Fig. 4, so that the surface of the landside will be smooth, as indicated. The blade 11 will be turned outwardly relative to the landside so that it will tend to draw the earth which it slices from the side of the furrow wall inwardly and throw the same down upon the bottom of the furrow. The frame 12 is made sufficiently high so that in no case will the upper part of said frame where the same overreaches the edge of the furrow wall come in contact with the surface of the ground or any object normally found upon said surface. As shown in Fig. 3, the brace 15 may run back from the upper portion of frame 12 and be bolted onto the inner part of landside 14.

As shown in Fig. 1, I provide a special carrier for the frame 12 which is not bolted directly to the landside 14 but is pivotally secured at 16 to a lug 17 bolted to the inside of the landside. A bolt 18 extends through the landside and through an aperture in the rearwardly extended frame member 20 which forms the pivotal connection of frame with lug 17. Surrounding the bolt 18 and extending between the portion 20 and a collar or nut 21 on the bolt 20 is a spring 22 which operates to force the member 20 toward the landside 14 and consequently force the blade 11 outwardly therefrom. A bolt 23 is threaded into portion 20 and has the end thereof held in engagement with the inner side of the landside by means of spring 22. By this bolt 23 the member 20 may be adjusted to cut a greater or less slice from the furrow wall. The spring permits the blade 11 to jump inwardly should it contact with a stone or root which had been passed by the plow proper, thus preventing breakage.

In some cases where the land is quite stony I contemplate using a device, such as shown in Fig. 5, which comprises a base member or plate 24 secured by bolts 25 to the inside of the landside 14 of the plow. Extending outwardly from this base 24 are a suitable number of hooks 26, 27, 28 and 29. The hooks are spaced apart both vertically and rearwardly, hook 26 being the bottom hook and the nearest the landside. Hook 27 is positioned so as to cut from the furrow wall just above the part cut by hook 26 and not quite so deeply as hook 26. Similarly hook 28 cuts above the part cut by hook 27 and not so deeply as hook 27, and hook 29 cuts still higher up and less deeply than hook 28. When this arrangement is used in shallow plowing it may be that hook 29 or even hook 28 might not engage the furrow wall while in deeper plowing all would engage. These hooks operate to tear the earth from the furrow wall and will spread the same quite evenly in the bottom of the furrow while their successive elevation from the hook 26 which cuts lowest down to the hook 29 which cuts highest up will permit ready clearance of all of the earth torn out and will prevent clogging.

The mode of operation of my improvements and the advantages incident thereto have been fully pointed out in connection with the detailed description thereof.

I claim:

1. A plow having a landside, a mold-board, and means carried by the plow at the rear thereof for cutting off a vertical slice of the furrow wall of full depth and depositing it in the furrow.

2. A plow having a mold-board, a landside, and means connected therewith and to the rear of the mold-board edge for cutting off a slice of land outside of the landside and of full depth and depositing it in the furrow to widen the furrow.

3. A plow having a landside, and means connected with the landside and having a portion extending outwardly beyond the outer plane and to the rear of said landside for cutting off a vertical slice of earth of full depth outside the landside to widen the furrow.

4. A plow having a landside, a frame member secured to said landside, and a vertical blade carried by said frame member outside of the outer plane of said landside and positioned to cut a slice of earth of full depth from the furrow wall and deposit it in the furrow.

5. A plow having a landside, a frame member connected to said landside so as to have freedom of movement relative thereto, a blade carried by said frame member, and means yieldingly holding said frame member in such position that the blade will cut a slice of earth along the furrow wall and outside the outer plane of the landside.

6. A plow having a landside and a frame member pivotally connected to the inner side of said landside so as to have freedom of movement relative thereto, a blade carried by said frame member, a bolt adjacent said blade, and a spring mounted on said bolt and yieldingly holding said blade to cut a slice of earth along the furrow wall and outside the outer plane of the landside.

7. A plow having a landside, a frame member secured to said landside, a vertical blade carried by said frame member outside of the outer plane of said landside and positioned to cut a slice of earth from the furrow wall and deposit it in the furrow, and a bolt mounted on said frame member adapted to adjustably vary the thickness of the slice of earth.

In testimony whereof I affix my signature in presence of two witnesses.

CHARLES J. TUSETH.

Witnesses:
H. A. BOWMAN,
F. A. WHITELEY.